Feb. 25, 1964     N. J. ZIEGLER, SR     3,121,908
MULTIPLE BUSHING, CORROSION RESISTANT HINGE
Filed July 28, 1961

*INVENTOR.*
NORMAN J. ZIEGLER, SR.

BY Paul Maleson
ATTORNEY

United States Patent Office 3,121,908
Patented Feb. 25, 1964

3,121,908
MULTIPLE BUSHING, CORROSION RESISTANT HINGE
Norman J. Ziegler, Sr., Wyomissing Hills, Pa., assignor to Reading Body Works, Inc., Reading, Pa., a corporation of Pennsylvania
Filed July 28, 1961, Ser. No. 127,688
2 Claims. (Cl. 16—128)

This invention relates to a hinge. More particularly, it relates to a hinge specifically adapted to be used as an exterior fitting on a vehicle body. Even more particularly, it is intended to be used as an exterior hinge on a truck body.

Exterior truck body hinges are known in many forms. The problems encountered are ones of ruggedness, economy and resistance to corrosion. The problem of providing an exterior hinge which suitably resists corrosion while avoiding uneconomic costs in providing such an hinge has heretofore been a barrier.

A common type of hinge heretofore provided on such truck bodies has been the "piano" type hinge. This type of hinge is provided with a long series of interacting knuckles or hinge members. A problem with this type of hinge is the fact that where the hinged side of the door or other opening is long, as is commonly and typically the case, the piano type hinge presents a relatively very large bearing surface among its parts. This affords a large area for corrosion to set in and with only a relatively small amount of corrosion, the hinge becomes very difficult to move.

Attempts have been made to provide non-corrosive hinges or bushings therefor. Attempts have been made to use nylon bushings, but one difficulty with such a bushing is that its installation in the hinge assembly prevents welding the hinge parts or assembly together or to the truck body or door, since the heat would be detrimental to the characteristics of the plastic. Thus, less economic fastening means must be used.

Attempts to use no bushngs at all have been made, but the corrosion encountered in ordinary truck use has quickly damaged such hinges. Attempts have been made to use bronze bushings, but such hinges are subject to damage from salt. Such salt is commonly thrown up onto truck bodies from roads which have been salted because of winter conditions.

It is an object of this invention to provide a hinge.

It is an object of this invention to provide a vehicle body exterior hinge.

It is another object of this invention to provide a corrosion-resistant, economic, hinge adapted for exterior use on truck bodies.

It is yet another object of this invention to provide a hinge for exterior use on truck bodies wherein the major portions of said hinge are made of cold rolled steel and are equipped with stainless steel bushings.

A still further object of this invention is to provide an exterior truck hinge wherein the major portion of said hinge is made of cold rolled steel and said hinge comprises a hinge pin, a bracket at each end of said hinge pin, said bracket being attached to the truck body, and a stainless steel bushing in the form of a sleeve being positioned between said hinge pin and each said bracket.

Yet another object of this invention is to provide a truck body exterior hinge wherein the major portion of said hinge is made of cold rolled steel, and said hinge comprises a hinge pin, a bracket at each end of said pin, and a pair of cylindrical sleeve stainless steel bushings, concentric with each other and one being placed within the other, each of said pairs being positioned between a bracket and the hinge pin.

Other aims and objects of this invention are made apparent in the specification and claims.

The invention is best understood in connection with the accompanying drawings, in which like reference numerals refer to like parts and in which.

Figure 3:
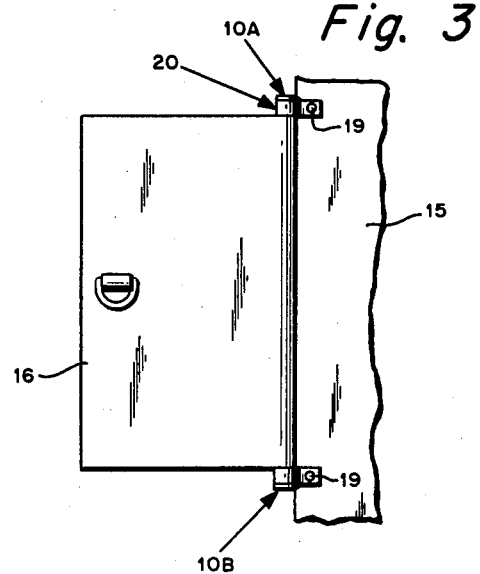
FIGURE 3 is a partially fragmented view of the hinge connecting a door to a body.

The hinge generally designated by reference numeral 20 comprises a hinge pin 11. This hinge pin is an elongated solid rod of cold rolled steel and runs substantially the length of the door 16 to be attached to the truck body panel or enclosure 15. The hinge pin 11 is normally attached in any convenient manner along its length between the brackets to the edge of the door 16.

A pair of brackets are required, one at each end of the hinge pin. In the vertically oriented hinge illustrated, upper bracket 10A and lower bracket 10B are provided. These brackets are also made of cold rolled steel preferably, each bracket is stamped from two pieces of steel, one piece being formed to provide the bracket wall 14A and then extending at each end to provide the parallel, opposing and touching straight extensions 14C and 14D respectively.

A bracket end closure 14B, also made of cold rolled steel and substantially circular in shape is provided to close one end of the bracket, and is affixed thereto, preferably by welding.

An inner bushing 12 is provided around the hinge pin 11 for a short distance, one of the inner bushings 12 being provided at each end of the hinge pin 11, and extending inwardly a relatively short distance from said end.

Figure 1:
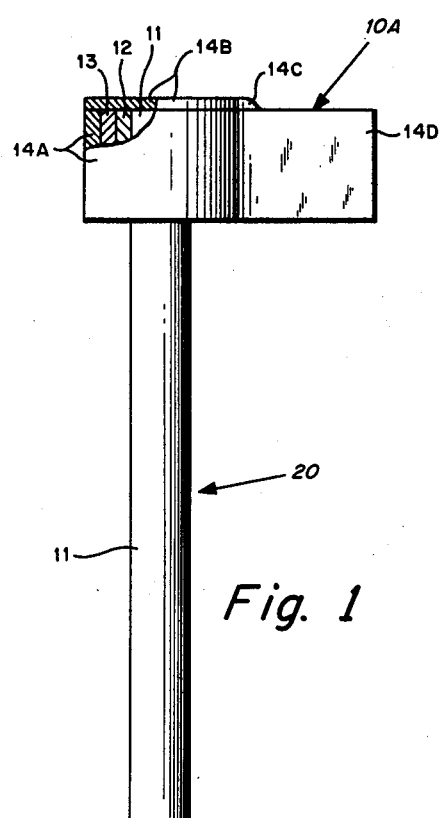
FIGURE 1 is a partially fragmented front view of a vertical hinge, partially in cross-section taken along line 1—1 of FIGURE 2.
Figure 2:
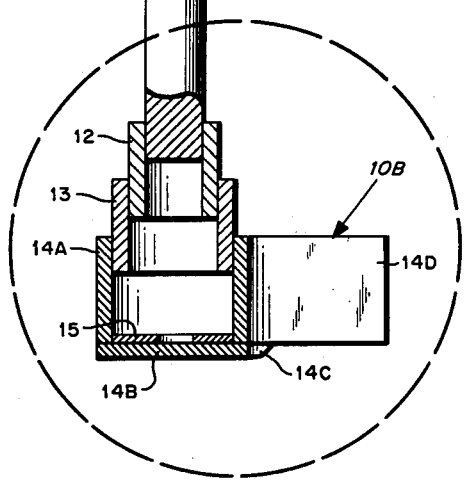
FIGURE 2 is a bottom view of the hinge.

An outer bushing 13 is provided around each inner bushing 12. Both inner and outer bushings are cylindrical sleeves, and are preferably the same length. The outer diameter of the inner bushing and the inner diameter of the outer bushing are such that the inner bushing fits with a turning fit into the outer bushing. For purposes of illustration, the lower bracket 10B and its bushings 12 and 13 are shown partly disassembled and in cross-section within the dotted circle at the bottom of hinge 20 in FIGURE 1. The inner and outer bushings 12 and 13 respectively are made of stainless steel.

In addition, when the hinge is vertical, such as is illustrated, an end bushing 15, also of stainless steel, is provided. This end bushing 15 is a disk which fits against the inner surface of bracket end closure 14B. When the hinge is horizontal, the end bushing 15 may be omitted, for reasons explained below.

The brackets 10A and 10B are affixed to the enclosure 15 preferably by spot welds 19. Spot welding is an economic and fast means of attachment, and in this case such spot welding may be performed even with the complete assembled hinge in place, without fear of damaging any bushings.

For a typical truck body, it has been found that the following specifications are satisfactory: the hinge pin may be .3125" O.D. plus .002 minus .002 x length required, type 1018 cold rolled steel rod. The inner bushing may be .315" I.D. minus .000 plus .004 x .468" long plus or minus .005, bur free I.D. and O.D.; .371 O.D. minus .000 plus .004; type 304 stainless steel; mfg'd from redrawn seamless tubing. The outer bushing may be .377" I.D. minus .000 plus .004 x .433" O.D. minus .000 plus .004 x 468" long plus or minus .005; bur free I.D. and O.D.; type 304 stainless steel; mfg'd from redrawn seamless tubing. The end bushing may be .375 O.D. x .140 I.D. x .031 thick; type 304 stainless steel. The brackets may be stamped and formed part made of .0598 cold rolled steel; outer bushing inserted on mandrel while leg of bracket is rolled around bushing; legs spot welded when wrap around completed and while still on mandrel.

An important aspect of this invention is the fact that each end of the hinge pin 11 is provided with a pair of stainless steel bushings. Thus, the hinge pin 11 may corrode and stick to the inner bushing 12, and the brackets 10A or 10B may corrode and stick to the outer bushings. Even if this corrosion does occur, the touching stainless steel faces of the inner and outer bushings will not corrode, and thus free turning will be permitted.

It has been found that where only one stainless steel or other bushing is provided between a bracket and a hinge pin, the bracket and hinge pin will themselves corrode and tend to impair free turning. The presently disclosed structure on the other hand provides two touching turning faces each of stainless steel, and corrosion does not occur at this interface.

Preferably, where a vertical hinge is provided, the stainless steel end bushing 15 is provided as has been described. Conveniently, this end bushing is a stainless steel washer with a hole in it. This structure has the advantage of providing a drain for sand, grit or other material that may settle in the lower bracket, as well as having the added advantage of being a standard and easily obtained part which does not have to be specially manufactured. The end bushing 15 has its greatest utility in the lower bracket of a vertical hinge. It has been found that because of the relatively small bearing area on the end of the hinge pin, a single end bushing 15 is satisfactory. This is because the relatively small area provides a relatively small area for corrosion and hence does not tend to seriously impair free turning.

The scope of this patent is to be determined by the appended claims, and is not intended to be limited by the specific embodiments shown and described.

I claim:

1. A hinge adapted for relatively infrequent turning and exterior use on a vehicle comprising an elongated hinge pin, a pair of brackets, one of said brackets being provided at each end of said hinge pin, an outer bushing in the form of a cylindrical sleeve positioned within each of said brackets and having a turning fit with said bracket, an inner bushing having the form of a cylindrical sleeve positioned within each of said outer bushings and having a turning fit with said outer bushing, said hinge pin fitting within each of said inner bushings and having a turning fit with said outer bushing, said hinge pin and said brackets being made of steel, said inner and outer bushings being made of stainless steel, and each of said brackets comprising a strip of steel bent to form a bracket wall and extending to provide parallel straight extensions, a steel end closure, said closure welded to said wall, said extensions welded together, and both said brackets spot welded to said vehicle, whereby said hinge resists corrosive sticking.

2. A hinge as set forth in claim 1 wherein said hinge is vertically oriented, the said pair of brackets being respectively an upper bracket and lower bracket, and said lower bracket is provided with a stainless steel end bushing, said end bushing having the form of a flat disk having a drain hole therein and being provided in the bottom of said lower bracket.

References Cited in the file of this patent

UNITED STATES PATENTS

| | | |
|---|---|---|
| 693,247 | Edwards | Feb. 11, 1902 |
| 738,513 | Baker et al. | Sept. 8, 1903 |
| 1,934,920 | Franzen | Nov. 14, 1933 |
| 2,228,106 | Beria | Jan. 7, 1941 |
| 2,239,875 | Buckwalter | Apr. 29, 1941 |
| 2,297,023 | Phelan | Sept. 29, 1942 |
| 2,903,735 | Schneider | Sept. 15, 1959 |

FOREIGN PATENTS

| | | |
|---|---|---|
| 5,304 | Great Britain | Apr. 29, 1885 |